No. 703,446. Patented July 1, 1902.
W. L. McGOWAN.
CONDUIT.
(Application filed Oct. 23, 1901.)
(No Model.)
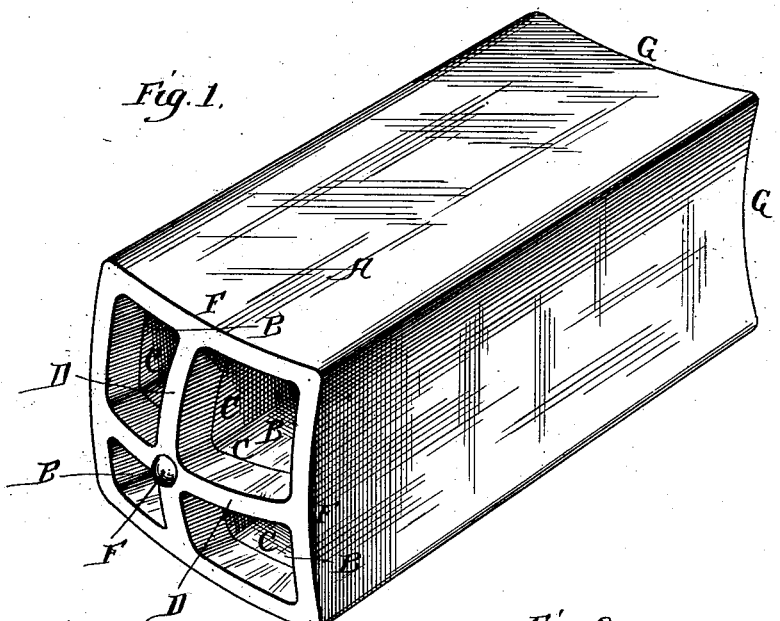
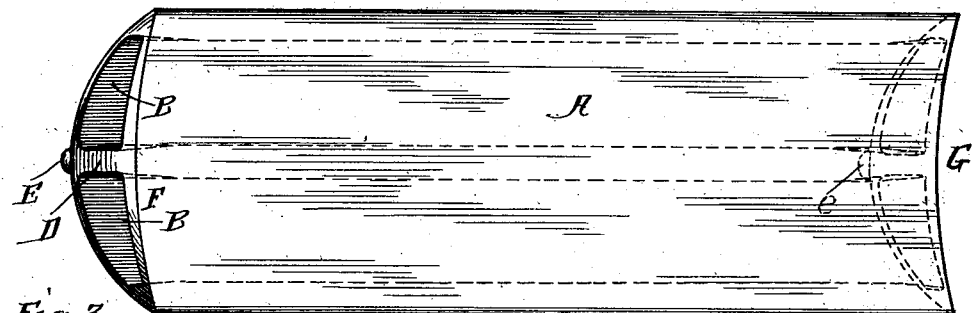
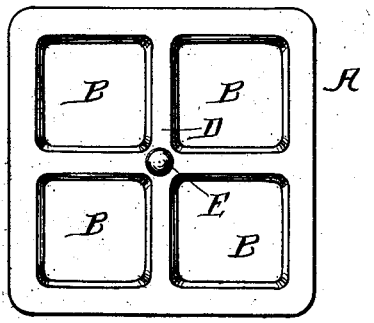
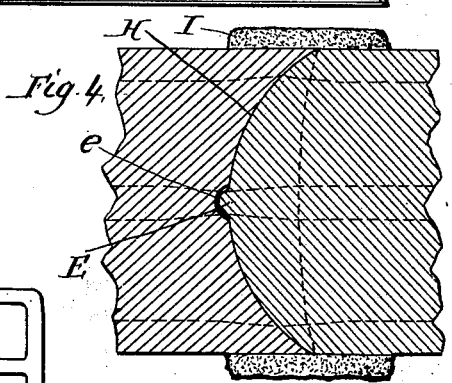
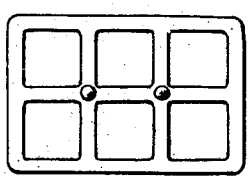
Witnesses: Wm. L. McGowan, Inventor,
H. B. Hallock By _____ Atty.

UNITED STATES PATENT OFFICE.

WILLIAM L. McGOWAN, OF PHILADELPHIA, PENNSYLVANIA.

CONDUIT.

SPECIFICATION forming part of Letters Patent No. 703,446, dated July 1, 1902.

Application filed October 23, 1901. Serial No. 79,676. (No model.)

*To all whom it may concern:*

Be it known that I, WILLIAM L. MCGOWAN, of the city and county of Philadelphia, State of Pennsylvania, have invented an Improvement in Conduits, of which the following is a specification.

My invention has reference to conduits; and it consists of certain improvements fully set forth in the following specification, and shown in the accompanying drawings, which form a part thereof.

Heretofore it has been customary to make terra-cotta or molded conduits intended for electric cables with a series of ducts extending lengthwise and divided by transverse partitions or walls, and such conduits are usually made in sections, butted end to end and united in cement joints. In practice the sections are held in alinement by dowel-pins projecting partly into each section. I have found, however, in practice that it is very difficult with any of the conduits heretofore employed to make proper alinement, especially where the conduit is required to change its direction of alinement, as in those cases the square ends of the sections cause separations, excepting at one edge, as will be readily understood, and thus present a weakened construction and more or less obstruction to the passage of the electric cable through ducts. I have found that it is frequently necessary in laying conduits of this class to chip the conduits by hand to secure the proper shape at the ends, and this is exceedingly slow and expensive and the work when finished is unsatisfactory and liable to produce injury to the cable when being inserted. Another and serious difficulty which arises out of the present type of terra-cotta conduits, which are extensively in use, is that after the conduit is laid if for other causes it is necessary to undermine the conduit all support is removed and the weight of the conduit, together with its load, falls wholly upon the concrete or cement bond at the joints and upon the dowel-pins when used and rupture and breakage frequently occurs, owing to the unsatisfactory manner of joining the adjacent sections of the conduit. As it frequently happens that the shrinkage in the conduit is unequal when being burned it follows that the dowel-pins often cannot be used, as the holes in the adjacent ends of the two sections are not always in alinement. For this reason the dowel-pins are very frequently omitted, and hence the whole strain comes upon the cement joints, and these are never intended to sustain any such strain. Its function is to make the conduit tight, keep out the moisture, and to hold the parts in proper alinement in process of erection.

The object of my invention is to overcome the above objections in the use of terra-cotta conduits, and this object is accomplished by forming my conduit-sections with spherical extended ends and socket ends of spherical shape, whereby the spherical end of one section fits into the spherical recess or socket portion of the next section. This construction allows of the slight adjustment necessary in all directions without producing any openings or gaps. Furthermore, if the conduit is undermined it is evident that the spherical end of the section is strongly held within the recessed end of the next section, so as to be self-sustaining and very strong. No strains would be put upon the surrounding cement, whose function is simply to keep out moisture by hermetically sealing the joint.

By my improved construction it is evident that dowel-pins and such expedients are entirely eliminated and the sections may be adjusted for change of alinement in an upward and downward or lateral direction with great facility and without the necessity of any skill or care on the part of the workman.

My invention also comprehends details of construction which will be better understood by reference to the drawings, in which—

Figure 1 is a perspective view of a section or length of my improved conduit. Fig. 2 is a side elevation of same. Fig. 3 is an end view of same. Fig. 4 is a sectional elevation showing the juncture or union of two sections or lengths of my improved conduit; and Fig. 5 is an end view of the conduit, showing a six-duct design.

A is the rectangular and tubular body and is divided longitudinally by walls C into a series of tubular ducts B, four of such ducts being shown in Figs. 1 and 3 and six in Fig. 5. While I have shown these ducts as rectangular or square in cross-section, the particular cross-section is immaterial. The ducts are made rectangular for the twofold reason—namely, they are more roomy and require the least terra-cotta or body material for the complete conduit. One end of the section is made spherical, as at D, the spherical surface being formed on the end of the divisional walls C and the top, side, and bottom walls of the conduit. In this manner the edges of the side, top, and bottom walls are made on a convex curve F. The center of the spherical surface is provided with a knob or button E. The other end of the body is formed with a spherical recess H, formed on the division and outside walls, and the center of this recessed end is provided with a small socket e, into which the button or knob of the next section fits, as shown in Fig. 4. Just as the edges F are convex on the spherical end so are the edges of the side, top, and bottom walls adjacent to the spherical recessed end made concave, as at G, and thereby adapted to fit the next section, as indicated in Fig. 4. The socket e should be a little larger in diameter than the knob or button E for permitting a reasonable adjustment when the adjacent sections are required to slightly change their alinement.

In laying the conduit in complete form the sections are butted end to end, the spherical end D of one section fitting into the spherical recessed end H of the next section, as shown in Fig. 4. The two ends fit snugly together, and as one actually fits into the other a very strong union is made which will resist a very heavy lateral pressure without rupture. The knob E fits the socket e, and thereby centers the two sections and permits any slight angular adjustments of them relatively to each other without disconnecting the knob with the socket. As the ends of the sections are spherical, it is evident that for all adjustments the ends will fit snugly and leave no gaps or openings, as always resulted in the form of conduit-sections at present in general use. When the conduit is laid, the joint between the sections is embedded in concrete or cement, as indicated at I in Fig. 4, for the purpose of bonding them together and hermetically sealing the joint. It is evident that even if this conduit be undermined the joint will not break through the concrete or cement, because the union of the conduit-sections is self-supporting.

While the best practice is to make the conduit-sections with one end convex and the other end concave, so that every section is alike, nevertheless it is evident the same general ends would be reached by making part of the sections with convex ends on both ends and part with concave ends on both ends. The type of joint between two adjacent sections would be the same in both instances.

I prefer to make the ends spherical, because for all adjustments of the sections the joint is tight and equally strong. I, however, do not limit myself to the exact details, as they may be modified without departing from the spirit of the invention.

Having now described my invention, what I claim as new, and desire to secure by Letters Patent, is as follows:

1. A conduit-section consisting of a body having a series of longitudinal ducts and division-walls separating them, one end of the section having the ends of the division-walls projecting to form a convex structure extending beyond the ends of all the side walls and the other end having the ends of the division-walls made recessed to form a concave structure of shape inversely corresponding to the convex structure and depressed beyond the ends of all the side walls.

2. A conduit-section consisting of a body having a series of longitudinal ducts and division-walls separating them, one end of the section having the ends of the division-walls projecting to form a convex structure and the other end having the ends of the division-walls made recessed to form a concave structure of shape inversely corresponding to the convex structure and further formed with a knob or button in the center of one of the ends and a recess in the center of the other end.

3. A conduit-section having its body formed rectangular in cross-section and divided by longitudinal walls into a series of parallel ducts and having the ends of its four side walls formed with convex-curved outside edges F and convex-curved ends D to the ends of the divisional walls projecting beyond the edges F.

4. A conduit-section having its body formed rectangular in cross-section and divided by longitudinal walls into a series of parallel ducts and having its end formed with convex-curved outside edges F and convex-curved ends D to the ends of the divisional walls and with a knob or button E at the apex of the convex end.

5. A conduit-section having its body formed rectangular in cross-section and divided by longitudinal walls into a series of parallel ducts and having the ends of its four side walls formed with concave-curved outside edges G and concave-curved ends H to the ends of the divisional walls depressed below the edges G.

6. A conduit-section having its body formed rectangular in cross-section and divided by longitudinal walls into a series of parallel ducts and having its end formed with concave-curved outside edges G and concave ends H to the ends of the divisional walls and with a recess e at the center of the concave end.

7. A conduit-section having outside walls and longitudinal division-walls forming a series of ducts, and in which the ends of the walls at one end of the section are projecting and shaped to conform to the curvature of a sphere and at the other end of the section are receding and also shaped to conform to the curvature of a sphere.

8. In a conduit structure the combination of two sections having longitudinal divisional walls and ducts butted together end to end and in which the ends of the division-walls of one section project to form a convex structure extending beyond the ends of all the sides of the conduit and the ends of the division-walls of the other section are recessed to form a corresponding concave structure.

9. In a conduit structure the combination of two sections having longitudinal divisional walls and ducts butted together end to end and in which the ends of the division-walls of one section project to form a convex structure and the ends of the division-walls of the other section are recessed to form a corresponding concave structure, and in which these ends of the sections are further coupled by a small knob and socket at the center one of which parts is upon the division-walls of one section and the other upon the division-walls of the other section.

10. In a conduit structure the combination of two sections having longitudinal divisional walls and ducts butted together end to end and in which the ends of the division-walls of one section project to form a convex structure highest at a point within the bounding sides, and the ends of the division-walls of the other section are recessed to form a corresponding concave structure recessed below the edges of the bounding sides, in combination with a cement or concrete bond encircling the conduit at the line of union.

In testimony of which invention I have hereunto set my hand.

WILLIAM L. McGOWAN.

Witnesses:
CHARLES FRANCIS SMITH,
R. M. KELLY.